United States Patent
Brox et al.

(10) Patent No.: US 12,014,270 B2
(45) Date of Patent: Jun. 18, 2024

(54) MIXTURE DISTRIBUTION ESTIMATION FOR FUTURE PREDICTION

(71) Applicant: IMRA EUROPE S.A.S., Sophia Antipolis (FR)

(72) Inventors: Thomas Brox, Freiburg (DE); Osama Makansi, Freiburg (DE); Özgün Cicek, Freiburg (DE); Eddy Ilg, Freiburg (DE)

(73) Assignee: IMRA EUROPE S.A.S., Sophia Antipolis (FR)

( * ) Notice: Subject to any disclaimer, the term of this patent is extended or adjusted under 35 U.S.C. 154(b) by 418 days.

(21) Appl. No.: 17/616,179

(22) PCT Filed: May 29, 2020

(86) PCT No.: PCT/EP2020/065089
§ 371 (c)(1),
(2) Date: Dec. 2, 2021

(87) PCT Pub. No.: WO2020/245066
PCT Pub. Date: Dec. 10, 2020

(65) Prior Publication Data
US 2022/0309341 A1    Sep. 29, 2022

(30) Foreign Application Priority Data
Jun. 3, 2019   (EP) .................................. 19177997

(51) Int. Cl.
*G06N 3/08*     (2023.01)
*G06V 10/82*    (2022.01)
(Continued)

(52) U.S. Cl.
CPC ............. *G06N 3/08* (2013.01); *G06V 10/82* (2022.01); *G06V 20/40* (2022.01); *G06V 20/58* (2022.01)

(58) Field of Classification Search
None
See application file for complete search history.

(56) References Cited

U.S. PATENT DOCUMENTS

| 11,340,610 B2 * | 5/2022 | Yu ........................ H04W 4/029 |
| 2019/0049970 A1 | 2/2019 | Djuric et al. |

FOREIGN PATENT DOCUMENTS

WO    2020245066 A1    12/2020

OTHER PUBLICATIONS

Foreign Communication from a Related Counterpart Application, International Search Report and Written Opinion dated Aug. 20, 2020, International Application No. PCT/EP2020/065089 filed on May 29, 2020.

(Continued)

*Primary Examiner* — Leon Flores

(57) ABSTRACT

A computer-implemented method for mixture distribution estimation of multi-modal future predictions comprising a training phase of a convolutional neural network comprising the steps of: (1) inputting a set of images of a driving environment, each containing at least one object of interest, and a set of future ground truths corresponding to the objects of interest; (2) sampling the solution space of the multi-modal future of the object of interest with an evolving winner-takes-all loss strategy by generating a predetermined number of hypotheses, penalizing all hypotheses equally, gradually releasing one part of the hypotheses by penalizing only the other part of the hypotheses being closer to the corresponding ground truth, so-called winning hypotheses, until only the best hypothesis being the closest one is penalized, and outputting final hypotheses; (3) sequentially fitting a multi-modal mixture distribution of future predictions to the final hypotheses.

15 Claims, 4 Drawing Sheets

(51) Int. Cl.
*G06V 20/40* (2022.01)
*G06V 20/58* (2022.01)

(56) References Cited

OTHER PUBLICATIONS

Foreign Communication from a Related Counterpart Application, Extended European Search Report dated Jan. 8, 2020, European Application No. 19177997.4 filed on Jun. 3, 2019.
Osama Makansi et al: "Overcoming Limitations of Mixture Density Networks: A Sampling and Fitting Framework for Multimodal Future Prediction", Jun. 2, 2019 (Jun. 2, 2019), XP055647816, Retrieved from the Internet: URL:http://openaccess.thecvf.com/content C Vpr 2019/papers/Makansi Overcoming Limitations of Mixture Density-Networks A-Samplin g and FTtting CVPR 2019-paper.pdf -[retrieved on-Nov. 29, 2019] abstract chapters 1-4; pp. 7144-7148; figures 1-3 chapter 7; p. 7151.
Anonymous "Author Guidelines", May 16, 2019 (May 16, 2019), XP055647821, Retrieved from the Internet: URL:https://web.archive.org/web/20190516060607/http://cvpr2019.thecvf.com/submission/main_conference/author_guidelines [retrieved on Nov. 29, 2019].
Yun Peng Li et al: From Here to There: Video Inbetweening Using Direct 3D Convolutions arxiv.org, Cornell University Library, 201 Olin Library Cornell University Ithaca, NY 14853, May 24, 2019 (May 24, 2019), XP081371254.
Rupprecht Christian et al: "Learning in an Uncertain World: Representing Ambiguity Through Multiple Hypotheses", 2017 IEEE International Conference on Computer Vision (ICCV), IEEE, Oct. 22, 2017 (Oct. 22, 2017), pp. 3611-3620, XP033283231, DOI: 10.1109/ICCV.2017.388 abstract chapters 1-4; p. 3611-3618; figures 1-6.

* cited by examiner

MIXTURE DISTRIBUTION ESTIMATION FOR FUTURE PREDICTION

CROSS-REFERENCE TO RELATED APPLICATIONS

The present application is a filing under 35 U.S.C. 371 as the National Stage of International Application No. PCT/EP2020/065089, filed May 29, 2020, entitled "MIXTURE DISTRIBUTION ESTIMATION FOR FUTURE PREDICTION," which claims priority to European Application No. 19177997.4 filed with the European Patent Office on Jun. 3, 2019 both of which are incorporated herein by reference in their entirety for all purposes.

FIELD OF THE INVENTION

The present invention relates to a computer-implemented method for mixture distribution estimation of multi-modal future predictions and a method for predicting and/or anticipating multiple futures of a vehicle's environment.

Such methods are useful especially in the field of assisting human drivers, advanced driver assistance systems or autonomous vehicles using cameras, radar, sensors, and other similar devices to perceive and interpret its surroundings.

BACKGROUND OF THE INVENTION

Computer-implemented method for predicting the future helps to plan actions and avoid possible dangers. As the future is uncertain to a large extent, modelling the uncertainty and multimodality of the future states is of great relevance. Existing approaches are rather limited in this regard and mostly yield a single hypothesis of the future or, at the best, strongly constrained mixture components that suffer from instabilities in training and mode collapse.

More specifically, existing work on future prediction is mostly restricted to predict a single future state, which often corresponds to the mean of all possible outcomes. In the best case, such system predicts the most likely of all possible future states, ignoring the other possibilities. As long as the environment stays approximately deterministic, the latter is a viable solution. However, it fails to model other possibilities in a non-deterministic environment, preventing the actor to consider a plan B.

The possibilities of deep learning have attracted increased interest in future prediction with convolutional neural networks (CNNs). Due to the uncertain nature of future prediction, many works target predicting uncertainty along with the prediction. The publication entitled "Motion prediction of traffic actors for autonomous driving using deep convolutional networks" by Djuric et al. predicts the single future trajectories of traffic actors together with their uncertainty as the learned variance of the predictions. The publication entitled "Multimodal interaction-aware motion prediction for autonomous street crossing" by Radwan et al. predicts single trajectories of interacting actors along with their uncertainty for the purpose of autonomous street crossing. The publication entitled "Learning a physical long-term predictor" by Ehrhardt et al. predicts future locations of the objects along with their non-parametric uncertainty maps, which is theoretically not restricted to a single mode. However, it was used and evaluated for a single future outcome. Despite the inherent ambiguity and multimodality in future states, all approaches mentioned above predict only a single future.

Some works proposed methods to obtain multimodal predictions with CNNs. The publication entitled "Multiple choice learning: Learning to produce multiple structured outputs" by Guzman-Rivera et al. introduces the Winner-Takes-All (WTA) loss for Structured Support Vector Machines with multiple hypotheses as output.

In the publication entitled "Learning in an uncertain world: Representing ambiguity through multiple hypotheses" by Rupprecht et al., the authors address multimodality by predicting diverse hypotheses with a relaxed version of Winner-Takes-All (VVTA) loss, but no distribution and no uncertainty. They showed that minimizing the relaxed WTA (RWTA) loss is able to capture the possible futures for a car approaching a road crossing, i.e., going straight, turning left, and turning right. However, optimizing for general, unconstrained mixture distributions requires special initialization and training procedures and suffers from mode collapse. Despite capturing the future locations, this work does not provide the whole distribution over the possible locations.

Another option is to estimate a complete mixture distribution from a network, like the Mixture Density Networks (MDNs). However, optimizing for a general mixture distribution comes with problems, such as numerical instability, requirement for good initializations, and collapsing to a single mode.

Few methods predict mixture distributions, but only in a constrained setting, where the number of modes is fixed, and the modes are manually bound according to the particular application scenario. Some work proposed a recurrent MDN to predict possible driving behavior constrained to human driving actions on a highway. More recent work used MDNs to estimate the probability of a car being in another free space in an automated driving scenario.

FIG. 1a represents the normal mixture distribution network approach. A mixture density network (MDN) as in FIG. 1a models the distribution as a mixture of parametric distributions:

$$p(y \mid x) = \sum_{i=1}^{M} \pi_i \phi(y \mid \theta_i), \qquad (1)$$

where M is the number of mixture components, $\phi$ can be any type of parametric distribution with parameters $\theta_i$, and $\pi_i$ is the respective component's weight. Arbitrary distributions can still be approximated by using multiple mixture components. The parameters are all outputs of the network and depend on the input data x (omitted for brevity). Optimizing all parameters jointly in MDNs is difficult, becomes numerically unstable in higher dimensions, and suffers from degenerate predictions. Moreover, MDNs are usually prone to overfitting, which requires special regularization techniques and results in mode collapse.

SUMMARY OF THE INVENTION

The present invention aims to address the above-mentioned drawbacks of the different prior arts, and more particularly to propose a reliable method for mixture distribution estimation of multi-modal future predictions in driving environment. A good future predictor must be able to model the multimodality and uncertainty of a non-deterministic system and, at the same time, take all the available conditional information into account to shape the predicted distribution away from a non-informative uniform distribution.

A first aspect of the invention relates to a computer-implemented method for mixture distribution estimation of multi-modal future predictions in driving environment comprising a training phase of a convolutional neural network comprising the steps of: (1) inputting a set of images of a driving environment, each image containing at least one object of interest, and a set of future ground truths corresponding to the objects of interest; (2) sampling the solution space of the multi-modal future of the at least one object of interest with an evolving winner-takes-all loss strategy by (a) generating a predetermined number of hypotheses, (b) penalizing all hypotheses equally, (c) gradually releasing one part of the hypotheses by penalizing only the other part of the hypotheses being closer to the corresponding ground truth, so-called winning hypotheses, until only the best hypothesis being the closest one is penalized, (d) outputting final hypotheses after completion of the evolving winner-takes-all strategy; (3) sequentially fitting a multi-modal mixture distribution of future predictions to the final hypotheses by computing soft assignments of each hypothesis to a defined number of mixture components.

Such computer-implemented method presents the advantages of an approach that involves the prediction of several samples of the future, i.e. multi-modal future predictions, with an evolving winner-takes-all loss and iterative grouping of samples to multiple modes. In this approach, the objective of the sampling step is to sample (i.e. generate new samples of) the full actual solution space, while the objective of the fitting network is to construct a mixture distribution out of the generated hypotheses (output of the sampling step). Further, the proposed approach triggers good estimates of multimodal distributions and avoids mode collapse.

According to an advantageous embodiment, the set of images is a sequence of images of a driving environment corresponding to past timestamps along with a corresponding sequence of binary masks delimiting the at least one object of interest within the sequence.

Using a sequence of images and binary masks for the training phase which is close to the actual situation during the operating phase, improves the neural network training.

According to an advantageous embodiment, the inputted set of future ground truths includes the future locations of the objects of interest, the sampling step samples the solution space of future locations of the at least one object of interest and the fitting step fits a mixture distribution of multi-modal future object locations.

According to an advantageous embodiment, the first penalizing step results in moving all hypotheses to an equilibrium since they are pulled equally to all future ground truths and wherein the following releasing and penalizing steps consist in gradually releasing an increasing part of the hypotheses while gradually penalizing the remaining winning hypotheses until only one winning hypothesis is penalized which results in moving gradually the winning hypotheses toward the ground truths.

Using such evolving winner-takes-all (EWTA) loss strategy provides an alternative relaxation, which assures that no residual forces remain. It leads to much fewer hypotheses being unused than in usual winner-takes-all (WTA) loss and relaxed WTA loss and to a much better distribution of hypotheses in general. As a result, the obtained distribution reflects well the ground truth sample locations.

According to an advantageous embodiment, the convolutional neural network contains a sampling network for the sampling step, followed by a fitting network for the fitting step. Preferably, said sampling network is composed of an encoder network followed by two additional convolutional layers. More preferably, said fitting network is composed of two fully connected layers.

This architecture of the convolutional neural network only requires a single forward pass and is simple and efficient. For the encoder, one can use for instance the FlowNetS architecture proposed by Dosovitskiy et al. in the publication "Flownet: Learning optical flow with convolutional networks".

According to an advantageous embodiment, the training phase consists in: (1) training the sampling network using the evolving winner-takes-all loss strategy, (2) training the fitting network using a negative log-likelihood loss function while keeping the sampling network fixed, (3) removing the evolving winner-takes-all loss strategy and training both sampling and fitting networks end-to-end with the negative log-likelihood loss function.

The two-stage approach (EWTA+MDF) yields better distributions and suffers less from mode-collapse. Replacing EWTA by NLL ensures to minimize its negative log-likelihood and is more robust to outliers. The Negative Log-Likelihood (NLL) measures the fit of a ground-truth sample to the predicted distribution and allows evaluation on real data, where only a single sample from the ground truth distribution is available. Missing modes and inconsistent modes are both penalized by NLL when being averaged over the whole dataset.

A second aspect of the invention relates to a computer-implemented method for mixture distribution estimation of multi-modal future predictions in driving environment comprising an operating phase of the convolutional neural network trained according to the training phase method of the first aspect, the operating phase comprising the steps of: receiving a set of images, each image containing at least one object of interest; estimating a mixture distribution of multi-modal future predictions of the at least one object of interest.

After the training phase, the operating phase of the convolutional neural network allows to estimate a mixture distribution of multi-modal future predictions of objects of interest in real conditions such as in driving environment. Preferably, the estimating step estimates a mixture distribution of multi-modal future locations of the at least one object of interest A third aspect of the invention relates to a computer-implemented method for multi-modal future predictions in a vehicle's environment comprising an operating phase comprising the steps of: receiving one or several video frames from a plurality of modalities, so-called multi-modality video frames, of a vehicle's environment, corresponding to present and past timestamps; encoding into a latent representation, said multi-modality video frames by a spatial-temporal encoding convolutional neural network; combining into a composite representation, said latent representation with encoded conditioning parameters corresponding to timestamps at the desired future time horizons; predicting multiple future multi-modality video frames corresponding to multiple future modes of a multi-modal future solution space associated with likelihood coefficients by a convolutional neural network previously trained according to the first aspect, each predicted future mode resulting from the steps of: decoding said composite representation and generating one or several future multi-modality video frames of said vehicle's environment corresponding to the timestamps at the desired time horizons; and associating a likelihood coefficient to each predicted future mode in the multi-modal future solution space.

Such computer-implemented method presents the advantages of predicting all possible futures corresponding to the multi-modal future solution space while keeping all the received information and by adding conditioning parameters. Such method provides a richer future scene description, where the whole scene, with background and objects, is considered holistically, without distinction between the objects: the interactions between the objects are considered implicitly inside the holistic scene latent representation leading to a preservation of the scene complexity. Furthermore, the multiple predicted futures correspond to the most important modes of the multi-modal future solution space leading to a better interpretability of each prediction with respect to the multi-modal future solution space. A likelihood measure is associated to each predicted future leading to an increased interpretability and usability of ranked predicted futures.

A fourth aspect of the invention relates to a computer-implemented method for assisting a human driver to drive a vehicle or for assisting an advanced driver assistance system or for assisting an autonomous driving system, the method comprising the steps of: capturing a vehicle's environment into a series of video frames while the vehicle is driven; obtaining one or several multi-modality video frames from the series of captured video frames; supplying said multi-modality video to the second or third aspect; displaying to a driver's attention multiple predicted future modes of a multi-modal future solution space along with an indication of their likelihood coefficient, or providing to the advanced driver assistance system, said multiple predicted future modes of a multi-modal future solution space associated with their likelihood coefficient, or providing to the autonomous driving system, said multiple predicted future modes of a multi-modal future solution space associated with their likelihood coefficient.

A fifth aspect of the invention relates to a system comprising one or more computing devices configured to: receive one or several multi-modality video frames of a vehicle's environment, corresponding to present and past timestamps; encode into a latent representation, said one or several multi-modality video frames by a spatial-temporal encoding convolutional neural network; combine into a composite representation, said latent representation with encoded conditioning parameters corresponding to timestamps at the desired future time horizons; predict multiple future multi-modality video frames corresponding to multiple future modes of a multi-modal future solution space associated with likelihood coefficients by a convolutional neural network previously trained according to the first aspect, each predicted future mode resulting from a procedure configured to decode said composite representation and generate one or several future multi-modality video frames of said vehicle's environment corresponding to the timestamps at the desired time horizons; and associate a likelihood coefficient to each predicted future mode in the multi-modal future solution space.

A sixth aspect of the invention relates to a computer-implemented method for mixture distribution estimation for multi-modal solution estimation comprising a training phase of a convolutional neural network comprising the steps of: (1) inputting a set of data and a set of ground truth solutions associated to the set of data; (2) sampling the solution space with an evolving winner-takes-all loss strategy by (a) generating a predetermined number of hypotheses, (b) penalizing all hypotheses equally, (c) gradually releasing one part of the hypotheses by penalizing only the other part of the hypotheses being closer to the corresponding ground truth solutions, so-called winning hypotheses, until only the best hypothesis being the closest one is penalized, (d) outputting final hypotheses after completion of the evolving winner-takes-all strategy; (3) sequentially fitting a mixture distribution model of the multi-modal solution space to the final hypotheses by computing the soft assignments of each hypothesis to a defined number of mixture components.

Such method provides a generic deep learning approach that yields unconstrained multimodal distribution as output and demonstrate its use for future prediction and more generally for the estimation of multiple possible solutions in non-deterministic scenarios. The input data can be of any type such as 2D images, 3D cloud of points, nD vectors.

According to an advantageous embodiment, the first penalizing step results in moving all hypotheses to an equilibrium since they are pulled equally to all future ground truths and wherein the following releasing and penalizing steps consist in gradually releasing an increasing part of the hypotheses while gradually penalizing the remaining winning hypotheses until only one winning hypothesis is penalized which results in moving gradually the winning hypotheses toward the ground truths.

A seventh aspect of the invention relates to a computer-implemented method for mixture distribution estimation for multi-modal solution estimation comprising an operating phase of the convolutional neural network trained according to the training phase method of the sixth aspect, the operating phase comprising the steps of receiving a set of data and a set of ground truth solutions associated to the set of data and estimating a mixture distribution model of the multi-modal solution space.

BRIEF DESCRIPTION OF THE DRAWINGS

Other features and advantages of the present invention will appear more clearly from the following detailed description of particular non-limitative examples of the invention, illustrated by the appended drawings where.

DETAILED DESCRIPTION OF THE INVENTION

Before describing in more details, the different modes to carry out the present invention, it is reminded a couple of definitions for the ease of the comprehension.

Soft assignment refers to the soft max function which is a function that takes as input a vector of K real numbers and normalizes it into a probability distribution consisting of K probabilities.

For a given ground truth, a penalized hypothesis is an hypothesis attracted by this ground truth while a released hypothesis is an hypothesis not attracted by this ground truth. A hypothesis can be either penalized or released with respect to one or more ground truths. Such penalized hypothesis brings a penalty that is associated with "penalized" assumptions. And this penalty is the cost (loss) associated with this hypothesis, typically a measure of the distance between this hypothesis and the ground truths with respect to which it is penalized. Thus, when penalizing an hypothesis, the penalty associated with this hypothesis is taken into account in the calculation of the total loss to be minimized leading the distances between this hypothesis and the associated ground truths to be minimized which results in this hypothesis being indeed attracted by its associated ground truths.

Mixture distribution is the probability distribution of a random variable that is derived from a collection of other random variables as follows: first, a random variable is selected by chance from the collection according to given probabilities of selection, and then the value of the selected random variable is realized. The individual distributions that are combined to form the mixture distribution are called the mixture components, and the probabilities (or weights) associated with each component are called the mixture weights.

Training Scheme of the Mixture Distribution Estimation

Multimodal Future Prediction Framework

Figure 1A:
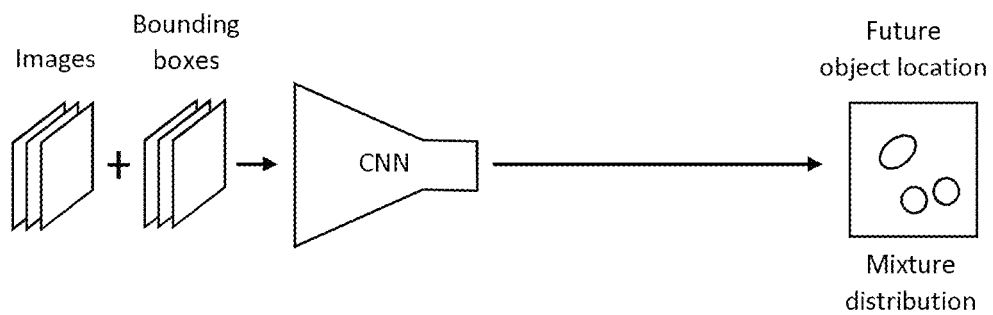
FIG. 1a represents the usual mixture distribution network approach.
Figure 1B:
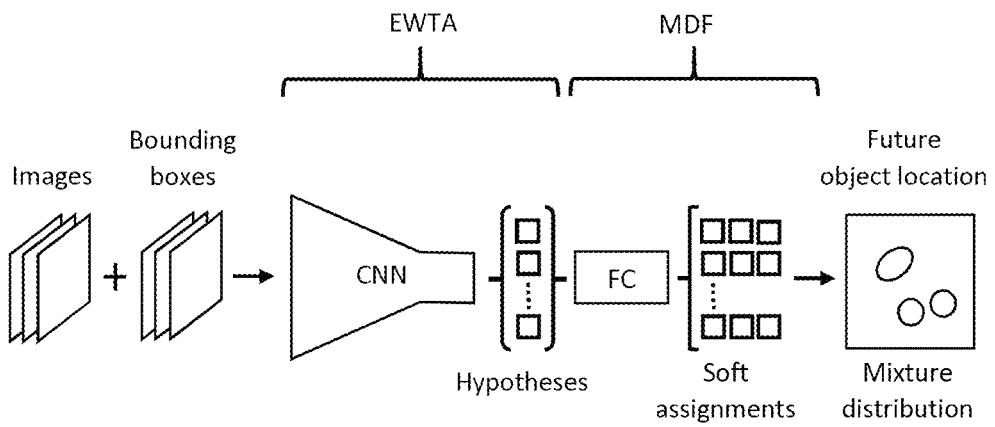
FIG. 1b represents the mixture distribution network according to the proposed approach.

FIG. 1b represents the mixture distribution network according to the proposed two-stage approach. The first stage generates hypotheses trained with an Evolving Winner-Takes-All (EWTA) loss and the second stage fits a mixture distribution (MDF) by predicting soft assignments of the hypotheses to mixture components.

The input of the network is past images and object bounding boxes for the object of interest $x=(I_{t-h}, \ldots, I_t, B_{t-h}, \ldots, B_t)$, where h is the length of the history into the past and the bounding boxes $B_i$ are provided as binary mask images, where pixels inside the box are 1 and others are 0. Given x, the goal is to predict a multimodal distribution $p(y|x)$ of the annotated object's location y at a fixed time instant $t+\Delta t$ in the future.

The training data is a set of images, object masks and future ground truth locations: $D=\{(x_1, \hat{y}_1), \ldots, (x_N, \hat{y}_N)\}$, where N is the number of samples in the dataset. Note that this does not provide the ground-truth conditional distribution for $p(y|x_i)$, but only a single sample $\hat{y}_i$ from that distribution. To have multiple samples of the distribution, the dataset must contain multiple samples with the exact same input $x_i$, which is very unlikely for high-dimensional inputs. The framework is rather supposed to generalize from samples with different input conditions. This makes it an interesting and challenging learning problem, which is self-supervised by nature.

In general, $p(y|x)$ can be modelled by a parametric or non-parametric distribution. The non-parametric distribution can be modelled by a histogram over possible future locations, where each bin corresponds to a pixel. A parametric model can be based on a mixture density, such as a mixture of Gaussians.

Sampling and Distribution Fitting Framework

Since direct optimization of Mixture Distribution Networks is difficult, it is proposed to split the problem into sub-tasks: sampling and distribution fitting as shown on FIG. 1b. The first stage implements the sampling. Motivated by the diversity of hypotheses obtained with the WTA loss, it is proposed an evolved version of this loss and then use it to obtain these samples, which we will keep referring to as hypotheses to distinguish them from the samples of the training data.

Given these hypotheses, one would typically proceed with the Expectation-Maximization algorithm to fit a mixture distribution, it is rather applied a second network to perform the distribution fitting. This yields a faster runtime and the ability to fine-tune the whole network end-to-end.

First Stage: Sampling with EWTA loss

To obtain diverse hypotheses, it is proposed to apply a so-called Evolving Winner-Takes-All (EWTA) loss strategy. More particularly, a WTA meta-loss is applied:

$$L_{WTA} = \sum_{k=1}^{K} w_k l(h_k, \hat{y}),$$

$$w_i = \delta\left(i = \underset{k}{\operatorname{argmin}} \|\mu_k - \hat{y}\|\right)$$

where l is the loss function between the predicted hypothesis $h_k$ and the ground truth $\hat{y}$, $\omega_i$ is the weight of the contribution of i-th hypothesis to the meta-loss, K is the number of estimated hypotheses and $\delta(\cdot)$ is the Kronecker delta, returning 1 when the condition is true and 0 otherwise.

For the standard WTA loss, the winner ($\omega_i$) selection is based on the Euclidean distance: all weights are set to 0 except for the "winning" hypothesis which is the closest to the ground truth. As a consequence, only the winning hypothesis is updated.

In this new version, we update the top-k winners. Referring to the above winner selection, this means that k weights are 1, while K-k weights are 0. We start with k=K and then decrease k until k=1. Whenever k is decreased, a hypothesis previously bound to a ground truth is effectively released from an equilibrium and becomes free to pair with a ground truth. The process is illustrated in FIG. 3c. EWTA provides an alternative relaxation, which assures that no residual forces remain. It leads to much fewer hypotheses being unused than in WTA and RWTA and to a much better distribution of hypotheses in general. The resulting spurious modes are removed later, after adding the second stage and a final end-to-end fine-tuning of our pipeline.

Figure 2A:
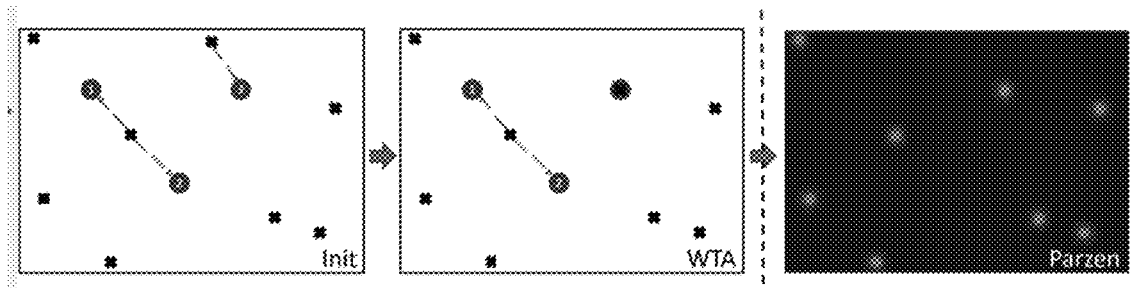
FIG. 2a represents an example of generating hypotheses with a WTA loss according to the prior art approach.
Figure 2B:
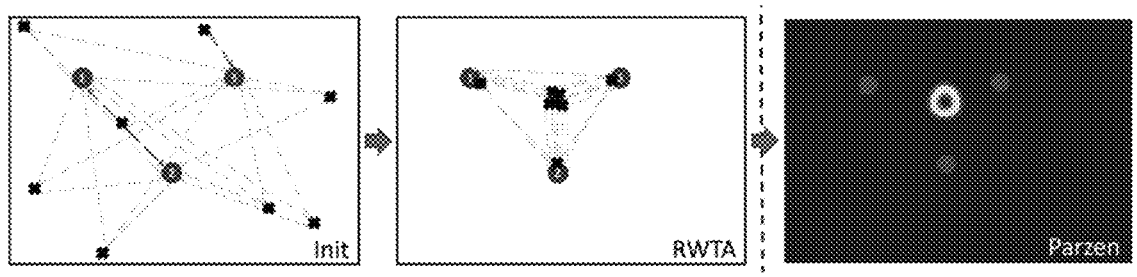
FIG. 2b represents an example of generating hypotheses with a RWTA loss according to the prior art approach.
Figure 2C:
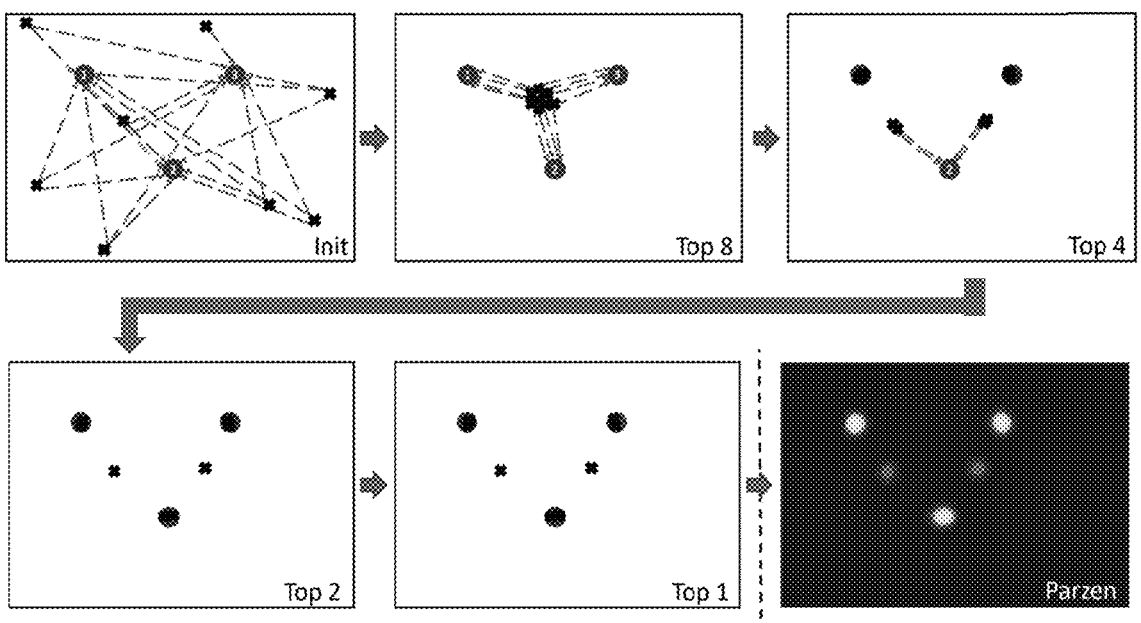
FIG. 2c represents an example of generating hypotheses with an EWTA according to the proposed approach.

FIG. 2a-2c illustrates a comparative example of generating hypotheses with different variants of the WTA loss. Eight hypotheses are generated by the sampling network (crosses) with the purpose to cover the three ground truth samples (numbered circles 1-3). During training, only some ground truth samples are in the mini-batch at each iteration. For each, the WTA loss selects the closest hypothesis (winning hypothesis) and the gradient induces an attractive force (indicated by arrows). It is also shown the distributions that arise from applying a Parzen estimator, also called kernel density estimation (KDE), to the final set of hypotheses.

FIG. 2a shows the usual WTA variant, where each ground truth sample selects one winner, resulting in one hypothesis paired with sample 3, one hypothesis in the equilibrium between samples 1 and 2, and the rest never being updated (inconsistent hypotheses). The resulting distribution does not well match the ground truth samples.

FIG. 2b shows an approach with a relaxed WTA loss, where the non-winning hypotheses are attracted slightly by all samples (thin arrows), moving them slowly to the equilibrium. This increases the chance of single hypotheses to pair with a sample. The resulting distribution contains some probability mass at the ground truth locations but has a large spurious mode in the center.

FIG. 2c shows the proposed approach with an evolving WTA loss, where all hypotheses are first penalized with respect to all ground truths, moving all hypotheses to the equilibrium (Top 8). Then each ground truth stops penalizing 4 hypotheses so as to release them while it is penalizing only the 4 winners, leading to 2 hypotheses pairing with samples 1 and 3 respectively, and 2 hypotheses moving to the equilibrium between samples ½ and ⅔, respectively (Top 4). The process continues until each sample selects only one winner (Top 1). The resulting distribution has three modes, reflecting the ground truth sample locations well. Only small spurious modes are introduced which can be removed later.

Second Stage: Fitting MDF

In the second stage of the network, we fit a mixture distribution to the estimated hypotheses: we call this stage Mixture Density Fitting (MDF). Similarly, to the approach presented in the publication entitled "Deep auto-encoding Gaussian mixture model for unsupervised anomaly detection" by Zong et al., we estimate the soft assignments of each hypothesis to the mixture components:

$\hat{y}_k = \text{softmax}(z_k),$ where k=1 ... K and $z_k$ is an M-dimensional output vector for each hypothesis k. The soft assignments yield the mixture parameters as follows:

$$\pi_i = \frac{1}{K}\sum_{k=1}^{K}\gamma_{k,i},$$

$$\mu_i = \frac{\sum_{k=1}^{K}\gamma_{k,i}\mu_k}{\sum_{k=1}^{K}\gamma_{k,i}},$$

$$\sigma_i^2 = \frac{\sum_{k=1}^{K}\gamma_{k,i}\left[(\mu_i - \mu_k)^2 + \sigma_k^2\right]}{\sum_{k=1}^{K}\gamma_{k,i}}.$$

According to the method the two stages of the network are trained sequentially, i.e., the fitting network being trained after the sampling network.

In a preferred version of the method, the estimated parameters from the above equations are inserted back into a Negative Log-Likelihood (NLL) loss in Equation (1). Indeed, since EWTA does not always ensure hypotheses that follow a well-defined distribution, the EWTA loss is finally removed and the full network is fine-tuned end-to-end with the NLL loss.

Training Phase of Generative Adversarial Network Architecture

Figure 3:
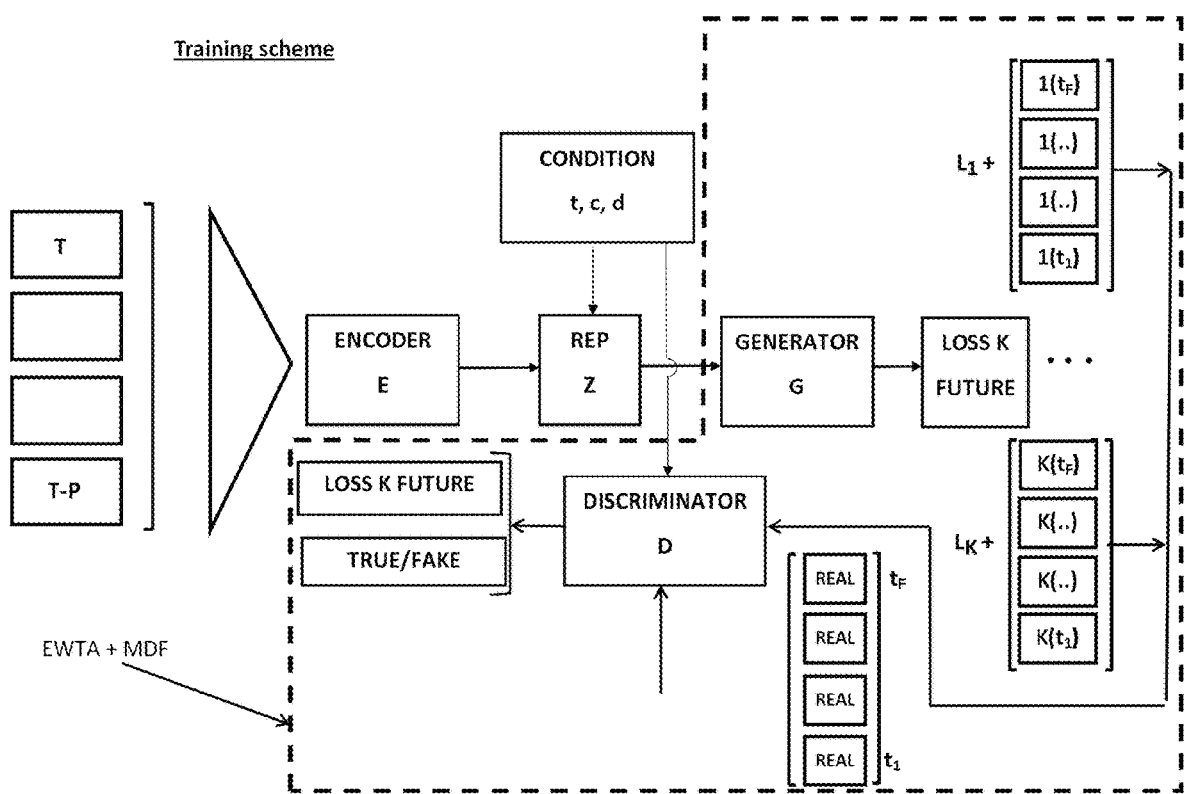
FIG. 3 represents the generative adversarial network architecture during the training scheme.

FIG. 3 represents a global generative adversarial network (GAN) architecture during the training phase. The detailed description and advantages of such GAN architecture is given in the prior publication EP2018306603.2 which is incorporated by reference hereby.

The GAN architecture is a specific global architecture built as the combination of several deep convolutional neural networks including the above described two-stage mixture distribution estimation networks, namely the sampling network trained with the EWTA loss and the MDF fitting network, which are called EWTA+MDF networks for sake of simplicity, or alternatively only one of these networks and/or only the loss functions of these networks. More specifically, this specific global architecture is the combination of three convolutional neural networks called for sake of simplicity network in the rest of the description.

First, a spatio-temporal encoding network E (a.k.a. Encoder) receives the input frames (one or several, present T or past and present {T-P, ..., T}) and converts them into a latent representation. The latent representation is next given to a compositing procedure which combines this latent representation with an encoding of the timestamp corresponding to the desired future time horizon. A composite representation Z is then output. Encodings of additional conditioning parameters (c, d) such as the class and the density of the objects to hallucinate, may also be added to the composite representation Z.

Second, a generative network G (a.k.a. Generator) receives as input the composite representation Z and decodes it into the output future frames corresponding to the timestamp of the desired future time horizon. The generative network is able to produce one or multiple future multi-modality frames for each one of the K multiple modes of the future solution space. The generative network also produces numerical values corresponding to the likelihood of each mode of the future solution space. The generative network G may also take into account the conditioning parameters relative to the hallucination stored in the composite representation Z and generates future images (i.e. future multi-modality video frames) containing new objects of the given class with the given density. More specifically in the example of FIG. 3, the generator G is outputting the prediction of one or several multi-modality video frames corresponding to future timestamps (for future timestamps t in $\{t_1, \ldots t_F\}$) of multiple future modes (1 to K) of a multi-modal future solution space associated with likelihood coefficients ($L_1$ to $L_K$).

Third, a discriminative network D (a.k.a. Discriminator), used only at training time, receives as input the predicted future frames output by the generative network along with the conditioning parameters and real future frames. It is trained to discriminate the predicted future frames from the real future frames. It classifies its inputs as Fake or Real depending on their origin. The discriminative network is able to process the one or multiple future frames produced by the generative network for each one of the K multiple modes of the future solution space.

The different networks constituting the proposed architecture are trained by minimizing several loss functions based on the above-described two-stage approach comprising a sampling network with an evolving WTA loss strategy followed by a mixture distribution fitting network.

This two-stage EWTA+MDF networks are specifically designed to ensure the following properties:
  each predicted future is different from the others and corresponds to a specific mode of the multi-modal future solution space;
  each predicted future mode is associated with a numerical value corresponding to the likelihood of occurrence of the predicted future;
  the real future in the training scheme corresponding to a given time horizon is very similar to one of the multiple predicted futures for this given time horizon and this specific predicted future has the highest likelihood value;
  for any given mode of the multi-modal future solution space, the multiple predictions corresponding to several different future time horizons are both temporally and spatially coherent.
  in the "anticipation" mode, the class and density of the hallucinated objects fit the class and density conditioning parameters.

The training scheme is performed until reaching convergence of both generative and discriminative networks, when the future multi-modality video frames predicted by the generative network are undistinguishable from real future multi-modality video frames.

Operating Phase of Generative Adversarial Network Architecture

Figure 4:
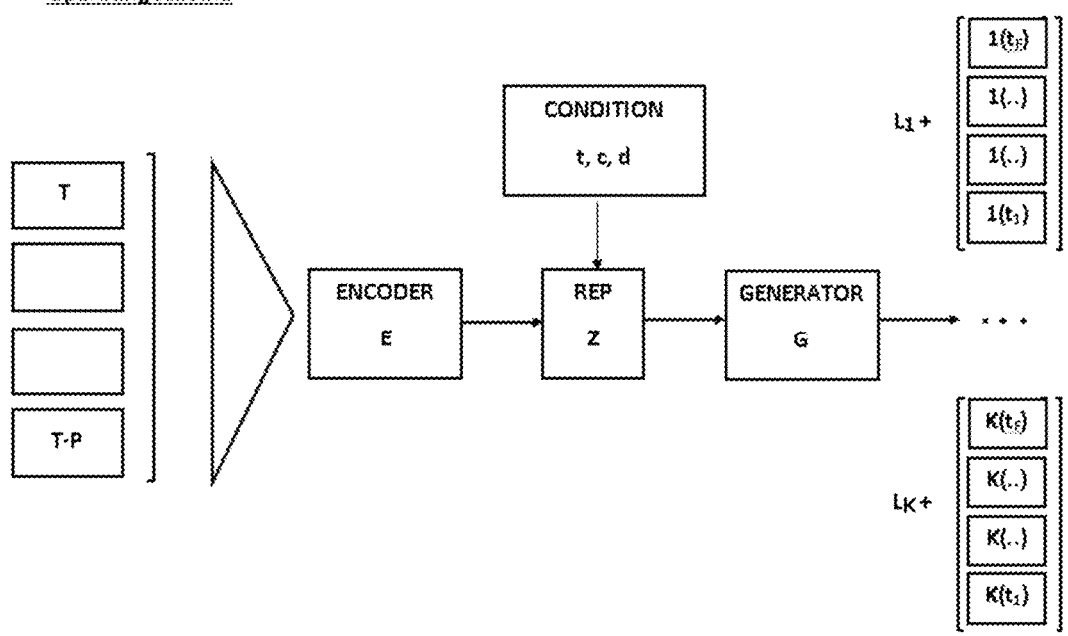
FIG. 4 represents the system architecture during the operating scheme.

FIG. 4 represents the system architecture of FIG. 3 during the operating scheme when the loss functions are removed. The detailed description and advantages of such GAN architecture is given in the prior publication EP2018306603.2 which is incorporated by reference hereby. The operating scheme follows the training scheme completed with the convergence of the generative and discriminative networks. During the operating scheme, the discriminative network is no longer necessary, and the architecture is then composed of two networks only: the encoder E and the generator G. For the rest of the procedure it is the same.

The input is one or several frames of various video modalities (could be RGB images, semantic maps, motion flow maps . . . ) corresponding to present and past timestamps (from present timestamp T to past timestamp T-P). The encoder E encodes into a latent representation, the multi-modality video frames. Then the latent representation is combined with encoded conditioning parameters corresponding to timestamps at the desired future time horizons into a composite representation (Z). The generator G is outputting the prediction of one or several multi-modality video frames corresponding to future timestamps (for future timestamps t in $\{t_1, \ldots, t_F\}$) of multiple future modes (1 to K) of a multi-modal future solution space associated with likelihood coefficients ($L_1$ to $L_K$). The likelihood coefficient may be determined by using convolutional neural networks able to estimate the uncertainty linked to their prediction. The prediction is done by decoding said composite representation (Z) and generating one or several future multi-modality video frames corresponding to the timestamps at the desired time horizons; and associating a likelihood coefficient to each predicted future mode in the multi-modal future solution space.

The future frames predicted by the generator have the following properties:
- the predicted future frames are containing multi-modality information; e.g. the semantic information associated to objects already visible in the scene at the present time ("prediction") or to objects not visible in the scene at the present time but expected to be visible in the future ("anticipation");
- the future frames are predicted following a Multiple Future Hypotheses paradigm in order to take into account the non-deterministic multi-modal future solution space; each individual future hypothesis leads to its own set of predicted future frames and is characterized by a likelihood measure corresponding to the probability of occurrence of the associated future hypothesis;
- for each individual future hypothesis, the prediction of a future frame is time-conditioned i.e. it is conditioned by the time horizon corresponding to the desired future frame; this means that the future frame corresponding to a given future time horizon is predicted directly, without the need of predicting recursively the intermediate time horizons nor predicting the full batch of intermediate frames running from the present time to the given time horizon;
- in the "anticipation" mode, when objects not visible at the present time are hallucinated in the future time, the prediction of a future frame is also conditioned by external parameters such as the class and density of objects to be hallucinated.

Other Applications

The above two-step approach method comprising a sampling network with an EWTA loss strategy followed by a fitting network with mixture distribution fit (MDF) has been described in relation to a mixture distribution of multi-modal future predictions in a driving environment. Other applications can be used with such two-step approach method for other tasks of mixture distribution estimation. In particular, such method would also be relevant for uncertainty estimation of optical flow, semantic/instance segmentation, pose estimation, image captioning and synthesis and action recognition.

For a mixture distribution estimation application for multi-modal solution estimation, the method comprises a training phase of a convolutional neural network comprising the steps of: (1) inputting a set of data and a set of ground truth solutions associated to the set of data; (2) sampling the solution space with an evolving winner-takes-all loss strategy by (a) generating a predetermined number of hypotheses, (b) penalizing all hypotheses equally, (c) gradually releasing one part of the hypotheses by penalizing only the other part of the hypotheses being closer to the corresponding ground truth solutions, so-called winning hypotheses, until only the best hypothesis being the closest one is penalized; (3) sequentially fitting a mixture distribution model of the multi-modal solution space to the generated hypotheses by computing the soft assignments of each hypothesis to a defined number of mixture components.

It will be understood that various modifications and/or improvements evident to those skilled in the art can be brought to the different embodiments of the invention described in the present description without departing from the scope of the invention defined by the accompanying claims.

The invention claimed is:

1. A computer-implemented method for mixture distribution estimation of multi-modal future predictions in driving environment comprising a training phase of a convolutional neural network comprising the steps of:
   inputting a set of images of a driving environment, each image containing at least one object of interest, and a set of future ground truths corresponding to the objects of interest;
   training the convolutional neural network to form a trained model to sample a solution space of the multi-modal future of the at least one object of interest with an evolving winner-takes-all loss strategy by
   generating a predetermined number of hypotheses,
   penalizing all hypotheses equally,
   gradually releasing one part of the hypotheses by penalizing only the other part of the hypotheses being closer to the corresponding ground truth, so-called winning hypotheses, until only the best hypothesis being the closest one is penalized, and
   outputting final hypotheses after completion of the evolving winner-takes-all strategy; and
   sequentially training the convolutional neural network to form the trained model to fit a multi-modal mixture distribution of future predictions to the final hypotheses by computing soft assignments of each hypothesis to a defined number of mixture components.

2. A computer-implemented method according to claim 1, wherein the set of images is a sequence of images of a driving environment corresponding to past timestamps along with a corresponding sequence of binary masks delimiting the at least one object of interest within the sequence.

3. A computer-implemented method according to claim 1, wherein the inputted set of future ground truths includes the future locations of the objects of interest, the sampling step samples the solution space of future locations of the at least one object of interest and the fitting step fits a mixture distribution of multi-modal future object locations.

4. A computer-implemented method according to claim 1, wherein the first penalizing step results in moving all hypotheses to an equilibrium since they are pulled equally to the future ground truths and wherein the following releasing and penalizing steps comprises gradually releasing an increasing part of the hypotheses while gradually penalizing the remaining winning hypotheses until only one winning hypothesis is penalized which results in moving gradually the winning hypotheses toward the ground truths.

5. A computer-implemented method according to claim 1, wherein the convolutional neural network contains a sampling network for the sampling step, followed by a fitting network for the fitting step.

6. A computer-implemented method according to claim 5, wherein said sampling network comprises an encoder network followed by two additional convolutional layers.

7. A computer-implemented method according to claim 5, wherein said fitting network comprises two fully connected layers.

8. A computer-implemented method according to claim 5, wherein the training phase comprises:
   training the sampling network using the evolving winner-takes-all loss strategy, training the fitting network using a negative log-likelihood loss function while keeping the sampling network fixed, and
   removing the evolving winner-takes-all loss and training both sampling and fitting networks end-to-end with the negative log-likelihood loss function.

9. A computer-implemented method for mixture distribution estimation of multi-modal future predictions in driving environment comprising an operating phase of the convolutional neural network trained according to the training phase of claim 1, the operating phase comprising the steps of:
   receiving a sequence of images of a driving environment corresponding to past timestamps along with a corresponding sequence of binary masks delimiting at least one object of interest within the sequence; and
   estimating, via the trained model, a mixture distribution of multi-modal future predictions of the at least one object of interest.

10. A computer-implemented method for multiple multi-modal future predictions in a vehicle's environment comprising an operating phase comprising the steps of:
   receiving one or several video frames from a plurality of modalities, socalled multi-modality video frames, of a vehicle's environment, corresponding to present and past timestamps;
   encoding into a latent representation, said multi-modality video frames by a spatial-temporal encoding convolutional neural network;
   combining into a composite representation, said latent representation with encoded conditioning parameters corresponding to timestamps at the desired future time horizons; and
   predicting multiple future multi-modality video frames corresponding to multiple future modes of a multi-modal future solution space associated with likelihood coefficients by the convolutional neural network previously trained according to the training phase of claim 1 to form the trained model, each predicted future mode resulting from the steps of:
   decoding said composite representation and generating one or several future multi-modality video frames of said vehicle's environment corresponding to the timestamps at the desired time horizons; and
   associating a likelihood coefficient to each predicted future mode in the multi-modal future solution space.

11. A computer-implemented method for assisting a human driver to drive a vehicle or for assisting an advanced driver assistance system or for assisting an autonomous driving system, the method comprising the steps of:
   capturing a vehicle's environment into a series of video frames while the vehicle is driven;
   obtaining one or several multi-modality video frames from the series of captured video frames;
   supplying said multi-modality video to the computer implemented method according to claim 9; and
   displaying to a driver's attention multiple predicted future modes of a multi-modal future solution space along with an indication of their likelihood coefficient, or
   providing to the advanced driver assistance system, said multiple predicted future modes of a multi-modal future solution space associated with their likelihood coefficient, or
   providing to the autonomous driving system, said multiple predicted future modes of a multi-modal future solution space associated with their likelihood coefficient.

12. A system comprising one or more computing devices configured to:
   receive one or several multi-modality video frames of a vehicle's environment, corresponding to present and past timestamps;
   encode into a latent representation, said one or several multi-modality video frames by a spatial-temporal encoding convolutional neural network;
   combine into a composite representation, said latent representation with encoded conditioning parameters corresponding to timestamps at the desired future time horizons; and
   predict multiple future multi-modality video frames corresponding to multiple future modes of a multi-modal future solution space associated with likelihood coefficients by the convolutional neural network previously trained according to the training phase of claim 1 to form the trained model, each predicted future mode resulting from a procedure configured to
   decode said composite representation and generate one or several future multi-modality video frames of said vehicle's environment corresponding to the timestamps at the desired time horizons; and
   associate a likelihood coefficient to each predicted future mode in the multi-modal future solution space.

13. A computer-implemented method for mixture distribution estimation for multi-modal solution estimation comprising a training phase of a convolutional neural network comprising the steps of:
   inputting a set of data and a set of ground truth solutions associated to the set of data;
   training the convolutional neural network to form a trained model to sample a solution space with an evolving winner-takes-all loss strategy by generating a predetermined number of hypotheses, penalizing all hypotheses equally, gradually releasing one part of the hypotheses by penalizing only the other part of the hypotheses being closer to the corresponding ground truth solutions, so-called winning hypotheses, until only the best hypothesis being the closest one is penalized, and outputting final hypotheses after completion of the evolving winner-takes-all strategy; and sequentially training the convolutional neural network to form the trained model to fit a mixture distribution model of the multi-modal solution space to the final hypotheses by computing the soft assignments of each hypothesis to a defined number of mixture components.

14. A computer-implemented method according to claim 13, wherein the first penalizing step results in moving all hypotheses to an equilibrium since they are pulled equally to all ground truths and wherein the following releasing and penalizing steps comprises gradually releasing an increasing part of the hypotheses while gradually penalizing the remaining winning hypotheses until only one winning hypothesis is penalized which results in moving gradually the winning hypotheses toward the ground truths.

15. A computer-implemented method for mixture distribution estimation for multi-modal solution estimation comprising an operating phase of the convolutional neural network trained according to the training phase of claim 13, the operating phase comprising the steps of:

receiving a set of data and a set of ground truth solutions associated to the set of data; and estimating, via the trained model, a mixture distribution model of the multi-modal solution space.

* * * * *